US006124871A

United States Patent [19]

Nakamura et al.

[11] Patent Number: 6,124,871

[45] Date of Patent: Sep. 26, 2000

[54] IMAGE RECORDING METHOD AND APPARATUS CAPABLE OF EFFICIENTLY DEVELOPING IMAGES ON A PHOTOSENSITIVE MATERIAL

[75] Inventors: Takeshi Nakamura; Ichizo Toya; Itsuo Fujiwara, all of Kanagawa-ken, Japan

[73] Assignee: Fuji Photo Film Co., Ltd., Kanagawa-ken, Japan

[21] Appl. No.: 08/847,757

[22] Filed: Apr. 23, 1997

[30] Foreign Application Priority Data

| | | | |
|---|---|---|---|
| Apr. 24, 1996 | [JP] | Japan | 8-102442 |
| Aug. 9, 1996 | [JP] | Japan | 8-211448 |

[51] Int. Cl.$^{7}$ .............................. B41J 2/385; G01D 15/08

[52] U.S. Cl. ............................................ 347/133; 347/261

[58] Field of Search ............................ 430/353; 423/373; 347/181, 133, 243, 241, 259, 256, 261, 262, 223, 202, 204; 219/216

[56] References Cited

U.S. PATENT DOCUMENTS

| | | | |
|---|---|---|---|
| 3,826,896 | 7/1974 | Thompson | 219/388 |
| 4,325,629 | 4/1982 | Ogata et al. | 355/27 |
| 5,167,987 | 12/1992 | Yu | 427/171 |
| 5,258,282 | 11/1993 | Kagami et al. | 430/619 |
| 5,382,504 | 1/1995 | Shor et al. | 430/619 |
| 5,502,532 | 3/1996 | Biesinger et al. | 354/298 |
| 5,580,588 | 12/1996 | Greene et al. | 425/373 |
| 5,834,151 | 11/1998 | Wada | 430/353 |

FOREIGN PATENT DOCUMENTS

| | | | |
|---|---|---|---|
| A1 0 355 876 | 2/1990 | European Pat. Off. | G03C 1/795 |

*Primary Examiner*—John Barlow
*Assistant Examiner*—Raquel Yvette Gordon
*Attorney, Agent, or Firm*—Sughrue, Mion, Zinn, Macpeak & Seas, PLLC

[57] ABSTRACT

A latent image of a medical image is recorded on a heat development photosensitive material. Development is carried out on the photosensitive material, on which the latent image has been recorded, and the medical image having multiple gradation levels is thereby obtained. The development is carried out at a heating temperature falling within the range of 120±10° C., at a width-direction temperature accuracy falling within the range of ±3° C., and for a development time falling within the range of 5 seconds to 30 seconds. In the heat development technique, the processing time is thus set to be a practically acceptable short time, noise is reduced, and a medical image having good image quality is obtained.

50 Claims, 4 Drawing Sheets

IMAGE RECORDING METHOD AND APPARATUS CAPABLE OF EFFICIENTLY DEVELOPING IMAGES ON A PHOTOSENSITIVE MATERIAL

BACKGROUND OF THE INVENTION

1. Field of the Invention

This invention relates to an image recording method and apparatus for recording an image on a heat development photosensitive material. This invention particularly relates to a dry type of image recording method and apparatus for recording a medical image, which has multiple gradation levels, (i.e. a continuous tone medical image) on a heat development photosensitive material. Specifically, this invention relates to an image recording method and apparatus for developing a latent image, which has been formed on a heat development photosensitive material by a laser beam scanning operation, and thereby obtaining a medical image having multiple gradation levels.

2. Description of the Prior Art

As methods for recording an image having multiple gradation levels, such as a medical image, on a recording material, wet development recording methods utilizing silver halide photosensitive materials have heretofore been popular. However, in hospitals, and the like, where medical images are processed, from the view point of environmental protection, the wet development using large amounts of various chemicals has become increasingly unfavorable. Also, it is not easy to carry out the wet development. Therefore, nowadays there is a strong demand for dry types of recording methods. As one of the dry types of recording methods, electrophotography is known. However, the electrophotography has the problems with regard to reproduction of multiple gradation levels. At present, it is considered that the electrophotography cannot be easily used in practice for medical images.

Therefore, it is considered to employ a heat development technique, which is known as one of dry types of recording techniques. However, even if the heat development technique is merely utilized, practically satisfactory medical images having a high gradation accuracy and good image quality cannot be obtained.

For example, in order for development to be carried out quickly by shortening the processing time, the processing temperature may be set to be high. However, in cases where the processing temperature is set to be high, much noise occurs in the image. Therefore, an image, which has good image quality and can serve as an effective tool in, particularly, the efficient and accurate diagnosis of an illness, cannot be obtained. In cases where the processing temperature is set to be low such that noise may be reduced and the image quality may be enhanced, a long processing time is required, and the processing efficiency cannot be kept high. In particular, as for a medical image, it is desired that the medical image has good image quality and can serve as an effective tool in the efficient and accurate diagnosis of an illness. In order for a medical image suitable for the practical use to be obtained with the heat development technique, various conditions must be taken into consideration.

SUMMARY OF THE INVENTION

The primary object of the present invention is to provide an image recording method, wherein a heat development technique is employed such that the processing time may be set to be a practically acceptable short time, noise may be reduced, and a medical image having good image quality may be obtained.

Another object of the present invention is to provide an image recording method, wherein a practically suitable medical image, which has good image quality and can serve as an effective tool in the efficient and accurate diagnosis of an illness, is obtained with a heat development technique.

A further object of the present invention is to provide a dry type of image recording method, wherein a medical image is recorded on a photosensitive material with a heat development technique such that the photosensitive material, on which the medical image has been recorded, may have good straightness and may thus be suitable for viewing on a viewing screen, the image recording method enabling the practical use of the heat development technique for the recording of a medical image having good image quality and multiple gradation levels.

A still further object of the present invention is to provide an apparatus for carrying out the image recording method.

The present invention provides a first image recording method, comprising the steps of recording a latent image of a medical image on a heat development photosensitive material, carrying out development on the heat development photosensitive material, on which the latent image of the medical image has been recorded, and thereby obtaining the medical image having multiple gradation levels, wherein the development is carried out at a heating temperature falling within the range of 120±10° C., at a width-direction temperature accuracy falling within the range of ±3° C., and for a development time falling within the range of 5 seconds to 30 seconds.

The present invention also provides a first image recording apparatus, wherein a latent image of a medical image is recorded on a heat development photosensitive material, development is carried out on the heat development photosensitive material, on which the latent image of the medical image has been recorded, and the medical image having multiple gradation levels is thereby obtained, the apparatus comprising:

i) a heating means for heating the heat development photosensitive material, on which the latent image of the medical image has been recorded, at a heating temperature falling within the range of 120±10° C., ii) a width-direction temperature controlling means for controlling the temperature at a width-direction temperature accuracy falling within the range of ±3° C., and iii) a developing means for carrying out the development for a development time falling within the range of 5 seconds to 30 seconds.

In the first image recording method and apparatus in accordance with the present invention, the width-direction temperature accuracy should preferably fall within the range of ±1° C. Also, the heating temperature should preferably be controlled at a temperature accuracy falling within the range of ±0.1° C. The term "control of heating temperature" as used herein means the control of the heating temperature such that the heating temperature may be stabilized with respect to time. Therefore, by the control of the heating temperature, the image quality of the medical image can be stabilized with respect to the direction, along which the heat development photosensitive material is conveyed, i.e. the length direction of the heat development photosensitive material.

Further, in the first image recording method and apparatus in accordance with the present invention, the development time should preferably fall within the range of approximately 10 seconds to approximately 20 seconds.

The term "multiple gradation levels" as used herein means at least 64 gradation levels. The multiple gradation levels may be constituted of 8-bit or 10-bit gray levels.

The present invention further provides a second image recording method, wherein a latent image is recorded on a heat development photosensitive material, which comprises a substrate and an emulsion layer overlaid upon the substrate, the emulsion layer containing a binder and a photosensitive silver halide dispersed in the binder, the heat development photosensitive material, on which the latent image has been recorded, is then conveyed along a curved conveyance path and subjected to heat development, and an image is thereby obtained, the method comprising the steps of:

i) carrying out the heat development at a development temperature, which is set to be equal to at least a glass transition temperature Tgb of the substrate of the heat development photosensitive material, ii) after the heat development, setting the heat development photosensitive material to straight form while the temperature of the heat development photosensitive material is being kept at a curl elimination temperature, which is set to be equal to at least the glass transition temperature Tgb of the substrate of the heat development photosensitive material, and iii) cooling the heat development photosensitive material while it is being kept in the straight form, the cooling being carried out at a cooling temperature lower than a glass transition temperature TgL, that is equal to the glass transition temperature Tgb of the substrate of the heat development photosensitive material or a glass transition temperature Tge of the binder contained in the emulsion layer, whichever takes a smaller value.

The present invention still further provides a second image recording apparatus, wherein a latent image is recorded on a heat development photosensitive material, which comprises a substrate and an emulsion layer overlaid upon the substrate, the emulsion layer containing a binder and a photosensitive silver halide dispersed in the binder, the heat development photosensitive material, on which the latent image has been recorded, is then subjected to heat development, and an image is thereby obtained, the apparatus comprising:

i) a conveyance means for conveying the heat development photosensitive material along a predetermined conveyance path, ii) a curved-path conveyance and heating means, which is located in the predetermined conveyance path, the curved-path conveyance and heating means heating the heat development photosensitive material, on which the latent image has been recorded, at a temperature, that is set to be equal to at least a glass transition temperature Tgb of the substrate of the heat development photosensitive material, iii) a curl eliminating means, which is located in the predetermined conveyance path and at a position downstream from the curved-path conveyance and heating means, the curl eliminating means setting the heat development photosensitive material to straight form while the temperature of the heat development photosensitive material is being kept to be equal to at least the glass transition temperature Tgb of the substrate of the heat development photosensitive material, and iv) a cooling means, which is located in the predetermined conveyance path and at a position downstream from the curl eliminating means, the cooling means cooling the heat development photosensitive material while the heat development photosensitive material is being kept in the straight form, the cooling being carried out at a cooling temperature lower than a glass transition temperature TgL, that is equal to the glass transition temperature Tgb of the substrate of the heat development photosensitive material or a glass transition temperature Tge of the binder contained in the emulsion layer, whichever takes a smaller value.

In the second image recording method and apparatus in accordance with the present invention, the temperature, at which the heat development photosensitive material is heated for the development, should preferably fall within the range of 120±20° C. As the material for the substrate of the heat development photosensitive material, polyethylene terephthalate (PET) may be employed. In such cases, the cooling temperature should preferably be at most 85° C. As the curl eliminating means, means for setting the heat development photosensitive material to straight form while the temperature of the heat development photosensitive material is being kept to be at least 85° C. should preferably be employed. Particularly large effects can be obtained when a cylindrical heating drum is employed as the curved-path conveyance and heating means.

In the second image recording method and apparatus in accordance with the present invention, the curved-path conveyance and heating means, the curl eliminating means, and the cooling means may constitute portions of the conveyance means and may respectively carry out the heating, the curl elimination, and the cooling while the heat development photosensitive material is being conveyed.

Further, the cooling means may comprise:

a) at least a single pair of conveying rollers for conveying the heat development photosensitive material, b) guide members, which are located at positions adjacent to the pair of the conveying rollers, the guide members guiding the heat development photosensitive material, which is conveyed by the pair of the conveying rollers, such that the heat development photosensitive material may be set to the straight form, and c) a cooling fan for cooling the heat development photosensitive material, which is being guided by the guide members.

With the first image recording method and apparatus in accordance with the present invention, wherein the heating temperature falls within the range of 120±10° C. and the development time falls within the range of 5 seconds to 30 seconds, the processing time can be set to be a practically acceptable short time, noise can be reduced, and an image having good image quality can be obtained. Also, since the width-direction temperature accuracy falls within the range of ±3° C., uniform finish quality, i.e. uniform image quality, can be obtained with respect to the width direction of the image.

Further, with the first image recording method and apparatus, wherein the heating temperature is controlled at a temperature accuracy falling within the range of ±0.1° C., uniform image quality can be obtained with respect to the length direction of the image.

With the second image recording method and apparatus in accordance with the present invention, the heat development is carried out on the heat development photosensitive material at a development temperature, which is set to be equal to at least the glass transition temperature Tgb of the substrate of the heat development photosensitive material. Ordinarily, at the development temperature, the photosensitive material will be caused to be curled. With the second image recording method and apparatus in accordance with the present invention, before the substrate of the photosensitive material, which has been deformed at the temperature equal to at least the glass transition temperature Tgb of the substrate, is fixed in the curled form, the photosensitive material is set to the straight form while its temperature is being kept at a temperature, which is set to be equal to at least the glass transition temperature Tgb of the substrate of the photosensitive material. Therefore, the problems do not occur in that the photosensitive material is fixed in the curled form. Thereafter, the photosensitive material is cooled while it is being kept in the straight form. The cooling is carried out at a cooling temperature lower than the glass transition temperature TgL, that is equal to the glass transition temperature Tgb of the substrate of the photosensitive material or the glass transition temperature Tge of the binder contained in the emulsion layer, whichever takes a smaller value. Accordingly, the photosensitive material can be fixed in the straight form. The obtained photosensitive material, on which the image has been recorded, has good straightness and can thus be suitable for viewing on a viewing screen.

DESCRIPTION OF THE PREFERRED EMBODIMENTS

Figure 1:
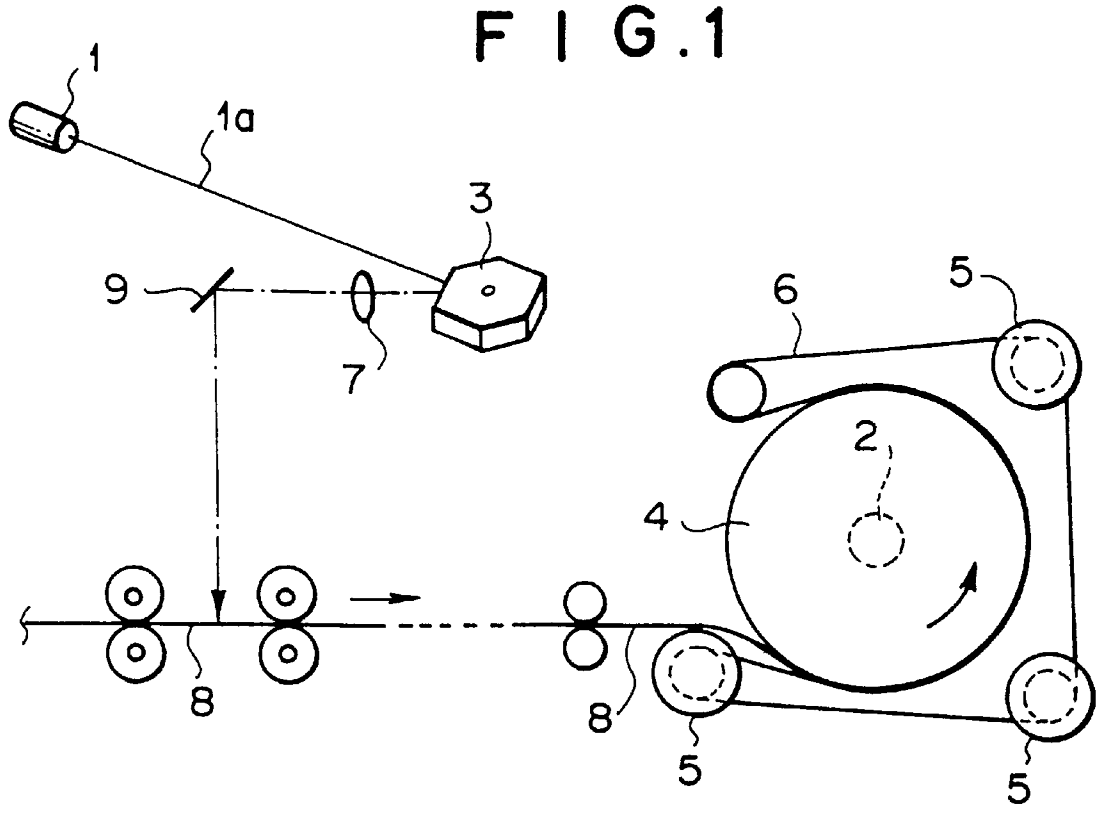
FIG. 1 is a schematic side view showing a first embodiment of the image recording apparatus in accordance with the present invention.

The present invention will hereinbelow be described in further detail with reference to the accompanying drawings.

As photosensitive materials for forming photographic images with heat development techniques, various photosensitive materials are disclosed in, for example, U.S. Pat. Nos. 3,152,904 and 3,457,075; and "Thermally Processed Silver Systems" by D. Morgan and B. Shely, Imaging Processes and Materials, Neblette, Eighth Edition, Edited by Sturge, V. Walworth, and A. Shepp, p. 2, 1969.

Ordinarily, such types of photosensitive materials contain a binder matrix (an organic binder matrix) and constituents dispersed in the binder matrix. The constituents include a reducible silver source (e.g., an organic silver salt), a catalytic amount of a photocatalyst (e.g., a silver halide), a toning agent for controlling the tone of silver, and a reducing agent. The photosensitive materials are stable at normal temperatures. When the photosensitive materials are heated at a high temperature (e.g., at least 80° C.) after being exposed, they form silver through the oxidation-reduction reaction of the reducible silver source (serving as an oxidizing agent) and the reducing agent. The oxidation-reduction reaction is promoted by the catalytic action of the latent image, which has been formed during the exposure. Silver, which has been formed by the reaction of the organic silver salt in the exposed region, provides a black image and forms a contrast to the un-exposed region. An image is thereby formed.

As for the layer constitution, a photosensitive layer alone may be overlaid upon a substrate. However, at least a single non-photosensitive layer should preferably be overlaid upon the photosensitive layer. Such that the amount or the wavelength distribution of light impinging upon the photosensitive layer may be controlled, a filter layer or an anti-halation layer may be formed on the same side as the photosensitive layer or on the side opposite to the photosensitive layer, or a dye or a pigment may be contained in the photosensitive layer. The photosensitive layer may be composed of a plurality of layers. Also, in order for the gradation to be adjusted, the photosensitive layer may be constituted of a combination of high-sensitivity layer/low-sensitivity layer or a combination of low-sensitivity layer/high-sensitivity layer.

Various additives may be added to the photosensitive layer, the non-photosensitive layer, or the other layers.

By way of example, the substrate may be constituted of a material, such as paper, polyethylene-coated paper, polypropylene-coated paper, animal parchment, or cloth; a sheet or a thin film of a metal, such as aluminum, copper, magnesium, or zinc; glass; glass coated with a metal, such as a chromium alloy, steel, silver, gold, or platinum; or a synthetic polymer material, such as a polyalkyl methacrylate (e.g., a polymethyl methacrylate), a polyester (e.g., a polyethylene terephthalate), a polyvinyl acetal, a polyamide (e.g., nylon), a cellulose ester (e.g., cellulose nitrate, cellulose acetate, cellulose acetate propionate, or cellulose acetate butyrate).

The photosensitive material employed in the image recording method and apparatus in accordance with the present invention may contain surface-active agents, antioxidants, stabilizers, plasticizers, ultraviolet absorbents, coating auxiliaries, and the like.

Each binder layer (e.g., a synthetic polymer layer) may form a self-supporting film together with the chemical agents contained in the photosensitive material.

The substrate may be covered with known auxiliary materials, for example, vinylidene chloride, acrylic monomer (such as acrylonitrile or methyl acrylate), and an unsaturated dicarboxylic acid (such as itaconic acid or acrylic acid), carboxymethyl cellulose, a copolymer or a terpolymer of a polyacrylamide, and a similar polymer material.

As the binders, those which are transparent or translucent are preferable. In general, they are colorless. As the binders, natural polymers, synthetic resins, synthetic polymers, synthetic copolymers, and other media capable of forming films may be employed. Examples of the binders include gelatin, gum arabic, polyvinyl alcohols, hydroxyethyl cellulose, cellulose acetate, cellulose acetate butyrate, polyvinyl pyrrolidones, casein, starch, polyacrylic acids, polymethyl methacrylates, polyvinyl chlorides, polymethacrylic acids, styrene-maleic anhydride copolymers, styrene-acrylonitrile copolymers, styrene-butadiene copolymers, polyvinyl acetals (such as polyvinyl formal and polyvinyl butyral), polyesters, polyurethanes, phenoxy resins, polyvinylidene chlorides, polyepoxides, polycarbonates, polyvinyl acetates, cellulose esters, and polyamides. The binder coating may be formed from water, organic solvents, or emulsions.

When necessary, two or more of the polymers may be used in combination. Such polymers are used in an amount sufficient to retain the constituents therein. Specifically, the polymers are used in proportions efficient for functioning as binders. Efficient proportions of the polymers can be determined easily and appropriately by experts in the art.

For example, the polymers listed below may be utilized. The temperatures shown at the right end below represent the glass transition temperatures Tg.

| | |
|---|---|
| Polyvinyl butyral | |
| Denka Butyral #3000-K | 67° C. |
| Denka Butyral #4000-2 | 73° C. |
| Polyvinyl acetate | 32° C. |
| Cellulose diacetate #V-AC | 180 to 190° C. |
| Cellulose acetate butyrate | |
| #CAB-171-15S | 161° C. |
| Chlorinated polypropylene #HP-215 | |
| Cellulose acetate butyrate | |
| #CAB-381-20 | 141° C. |
| Polyvinyl butyral | |
| BUTVAR #B-76 | 62 to 72° C. |
| BUTVAR #B-79 | 72 to 78° C. |
| (supplied by Monsanto Co.) | |
| Denka Butyral #3000-K | 67° C. |
| Denka Butyral #5000-A | 93° C. |
| (supplied by Denki Kagaku Kogyo K. K.) | |
| Cellulose acetate | |
| #CA.-398-10 | 180 to 189° C. |
| #CAP-482-20 | 147° C. |
| #CAB-381-20 | 141° C. |
| #CAB-171-15S | 161° C. |
| (supplied by Eastman Chemical Co.) | |
| Polymethyl methacrylate | 90 to 105° C. |
| Polyvinyl chloride | 75 to 105° C. |
| Polymethyl acrylate | approx. 10° C. |
| Polypropylene | −30 to −13° C. |
| Polyethylene | −130 to −36° C. |
| Cellulose diacetates | approx. 130° C. |
| Polyacrylonitrile | 90 to 100° C. |
| Polyvinylidene chloride | approx. −18° C. |
| Polyvinyl acetate | 32° C. |

As crosslinking agents for the binders, various kinds of hardening agents may be employed. Examples of the hardening agents include epoxy crosslinking agents, such as glycerol polyglycidyl ethers, ethylene-polyethylene glycol-diglycidyl ethers, lauryl alcohol-polyethylene oxide-glycidyl ethers, and glycidyl phthalimide; and isocyanate crosslinking agents, such as xylylene diisocyanate, hexamethylene diisocyanate, isocyanate-methylcyclohexane, isophorone diisocyanate, and diphenylmethane diisocyanate. The hardening agent may also be selected from ordinary crosslinking agents, such as aldehydes, chlorinated triazines, and polyvinylsulfonic acids. Among the above-enumerated hardening agents, glycerol polyglycidyl ethers, ethylene-polyethylene glycol-diglycidyl ethers, hexamethylene diisocyanate, and isophorone diisocyanate are preferable.

When necessary, two or more of the hardening agents may be used in combination. The hardening agents are used in proportions sufficient to crosslink the polymer. Efficient proportions of the hardening agents can be determined easily and appropriately by experts in the art.

It is very desirable to utilize toning agents. Examples of preferable toning agents are disclosed in Survey Report No. 17029 and include imides, such as phthalimide; cyclic imides, pyrazolin-5-ones, and quinazolinones (e.g., succinimide, 3-phenyl-2-pyrazolin-5-one, 1-phenylurazole, quinazoline, and 2,4-thiazolidinedione); naphthalimides, such as N-hydroxy-1,8-naphthalimide; cobalt complexes, such as hexamine trifluoro acetate of cobalt; mercaptans, such as 3-mercapto-1,2,4-triazole; N-(aminomethyl) aryldicarboxyimides, such as N-(dimethylaminomethyl) phthalimide; combinations of blocked pyrazoles, isothiuronium derivatives, and certain kinds of photo bleaching agents, such as a combination of N,N'-hexamethylene(1-carbamoyl-3,5-dimethylpyrazole), 1,8-(3,6-dioxaoctane)bis (isothiuronium trifluoro acetate), and 2-(tribromomethylsulfonyl)benzothiazole; merocyanine dyes, such as 3-ethyl-5-[(3-ethyl-2-benzothiazolinylidene)-1-methylethylidene]-2-thio-2,4-oxazolidinedione; phthalazinone, phthalazinone derivatives, and metal salts of these derivatives, such as 4-(l-naphthyl)phthalazinone, 6-chlorophthalazinone, 5,7-dimethyloxyphthalazinone, and 2,3-dihydro-1,4-phthalazinedione; combinations of phthalazinones and sulfinic acid derivatives, such as a combination of 6-chlorophthalazinone and a benzenesulfinic acid sodium salt, and a combination 8-methylphthalazinone and a p-trisulfonic acid sodium salt; a combination of phthalazine and phthalic acid; a combination of phthalazine (or a phthalazine adduct), maleic anhydride, and at least a single compound selected from the group consisting of phthalic acid, 2,3-naphthalenedicarboxylic acid, an o-phenylene acid derivative, and the anhydride thereof (e.g. the group consisting of phthalic acid, 4-methylphthalic acid, 4-nitrophthalic acid, and a tetrachlorophthalic acid anhydride); quinazolinediones; benzoxazine; naphthoxazine derivatives; benzoxazine-2,4-diones, such as 1,3-benzoxazine-2,4-dione; pyrimidines and asymmetric triazines, such as 2,4-dihydroxypyrimidine; and tetraazapentalene derivatives, such as 3,6-dimercapto-1,4-diphenyl-1H,4H-2,3a,5,6a-tetraazapentalene.

Among the above-enumerated toning agents, phthalazine is preferable.

As the reducing agent for the silver ion, photographic developing agents, such as Phenidone, hydroquinones, or catechols, may be employed. However, hindered phenols are preferable. Color photosensitive materials disclosed in U.S. Pat. No. 4,460,681 may also be utilized in the image recording method and apparatus in accordance with the present invention.

Examples of preferable reducing agents are described in, for example, U.S. Pat. Nos. 3,770,448, 3,773,512, and 3,593,863, Research Disclosure 17,029, and Research Disclosure 29,963. Examples of the preferable reducing agents include aminohydroxycycloalkenone compounds, such as 2-hydroxy-piperidino-2-cyclohexenone; esters of aminoreductones, serving as a precursor of a developing agent, such as piperidinohexose reductone monoacetates; N-hydroxyurea derivatives, such as N-p-methylphenyl-N-hydroxyurea; hydrazones formed from aldehydes or ketones, such as anthracene aldehyde phenylhydrazones; phosphamidophenols; phosphamidoanilines; polyhydroxy benzenes, such as hydroquinone, t-butyl-hydroquinone, isopropylhydroquinone, and (2,5-dihydroxy-phenyl)methyl sulfone; sulfhydroxamic acids, such as benzenesulfhydroxamic acid; sulfonamidoanilines, such as 4-(N-methanesulfonamido)aniline; 2-tetrazolylthiohydroquinones, such as 2-methyl-5-(1-phenyl-5-tetrazolylthio)hydroquinone; tetrahydroquinoxalines, such as 1,2,3,4-tetrahydroquinoxaline; amido oxines; azines, such as combinations of aliphatic carboxylic acid aryl hydrazides and ascorbic acid; combinations of polyhydroxy benzenes and hydroxylamine; reductone and/or hydrazine; hydroxamic acids; combinations of azines and sulfonamidophenols; α-cyanophenylacetic acid derivatives; combinations of bis-β-naphthol and 1,3-dihydroxybenzene derivatives; 5-pyrazolones; sulfonamidophenol reducing agents; 2-phenylindane-1,3-diones; chroman; 1,4-dihydropyridines, such as 2,6-dimethoxy-3,5-dicarboethoxy-1,4-dihydropyridine; bisphenols, such as bis(2-hydroxy-3-t-butyl-5-methylphenyl)methane, bis(6-hydroxy-m-tri) mesitol, 2,2-bis(4-hydroxy-3-methylphenyl)propane, and 4,4-ethylidene-bis(2-t-butyl-6-methyl)phenol; ultraviolet-sensitive ascorbic acid derivatives; and 3-pyrazolidones.

Among the above-enumerated developing agents, hindered phenols represented by the general formula shown below are particularly preferable.

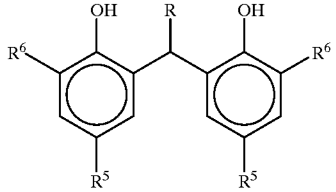

wherein R ordinarily represents hydrogen or an alkyl group having at most 10 carbon atoms (e.g., —$C_4H_9$ or 2,4,4-trimethylpentyl), and each of $R^5$ and $R^6$ represents an alkyl group having at most 5 carbon atoms (e.g., methyl, ethyl, or t-butyl).

As the silver halide, any of photosensitive silver halides (e.g., silver bromide, silver iodide, silver chloride, silver chlorobromide, silver iodobromide, and silver chloroiodobromide) may be employed. However, the silver halide should preferably contain iodine iron. No limitation is imposed on how the silver halide is added to the image forming layer. However, the silver halide is located such that it may be close to the reducible silver source. Ordinarily, the proportion of the silver halide should preferably fall within the range of 0.75% by weight to 30% by weight with respect to the reducible silver source. The silver halide may be prepared with conversion of the silver soap portion through the reaction with the halogen ion. Alternatively, the silver halide may be formed preliminarily and may be added at the time of occurrence of the soap. As another alternative, the two techniques may be combined with each other. The latter technique is preferable.

The reducible silver source may be constituted of any of materials containing a silver ion source which can be reduced. Silver salts of organic acids or hetero organic acids are preferable, and silver salts of aliphatic carboxylic acids having a long chain (with 10 to 30 carbon atoms, preferably with 15 to 25 carbon atoms) are more preferable. Organic or inorganic silver salt complexes, in which the ligand has an overall stability constant with respect to the silver ion, that falls within the range of 4.0 to 10.0, are also useful. Examples of preferable silver salts are described in, for example, Research Disclosure 17,029 and Research Disclosure 29,963. Examples of the preferable silver salts include silver salts of organic acids, such as gallic acid, oxalic acid, behenic acid, stearic acid, palmitic acid, and lauric acid; silver salts of carboxyalkylthioureas, such as 1-(3-carboxypropyl)thiourea and 1-(3-carboxypropyl)-3,3-dimethylthiourea; silver complexes of polymer reaction products obtained from aldehydes (such as formaldehyde, acetaldehyde, and butylaldehyde) and hydroxy-substituted aromatic carboxylic acids (such as salicylic acid, benzoic acid, 3,5-dihydroxybenzoic acid, and 5,5-thiodisalicylic acid); silver salts or complexes of thioenes, such as 3-(2-carboxyethyl)-4-hydroxymethyl-4-thiazoline-2-thioene and 3-carboxymethyl-4-thiazoline-2-thioene; a complex or a salt of silver with a nitrogen acid selected from the group consisting of imidazole, pyrazole, urazol, 1,2,4-thiazole, 1H-tetrazole, 3-amino-5-benzylthio-1,2,4-triazole, and benzotriazole; silver salts of saccharin, 5-chlorosalicylaldoxime, and the like; and silver salts of mercaptides. Among the above-enumerated silver sources, the behenic acid silver salt is preferable. The proportion of the reducible silver source, expressed in terms of the amount of silver, should preferably be at most 3 g/$m^2$, and should more preferably be at most 2 g/$m^2$.

The photosensitive material may also contain anti-fogging agents. The most efficient anti-fogging agent has heretofore been a mercury ion. The technique for using a mercury compound as the anti-fogging agent in a photosensitive material is disclosed in, for example, U.S. Pat. No. 3,589,903. However, from the view point of environmental protection, the use of the mercury compound is not desirable. As non-mercury anti-fogging agents, those disclosed in, for example, U.S. Pat. Nos. 4,546,075 and 4,452,885, and Japanese Unexamined Patent Publication No. 59(1984)-57234 are preferable.

Particularly preferable non-mercury anti-fogging agents are heterocyclic compounds having at least a single substituent group, which is represented by the formula —$CX^1X^2X^3$, wherein each of $X^1$ and $X^2$ represents a halogen, such as F, Cl, Br, or I, and $X^3$ represents hydrogen or a halogen. The heterocyclic compounds are disclosed in U.S. Pat. Nos. 3,874,946 and 4,756,999. Examples of preferable anti-fogging agents include the compounds represented by the formulas shown below:

(1)

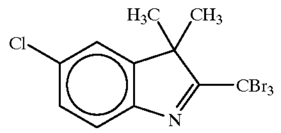

(2)

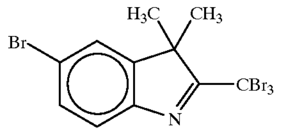

(3)

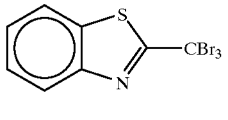

(4)

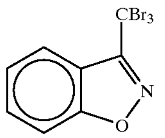

-continued (5)

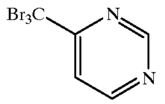

(6)

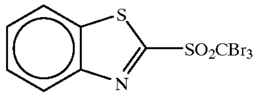

(7)

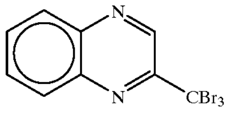

(8)

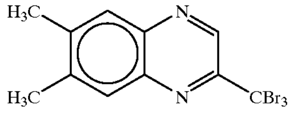

(9)

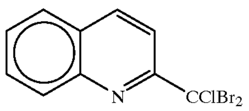

(10)

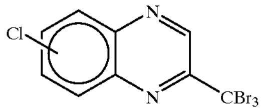

(11)

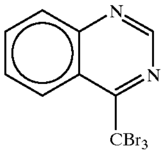

(12)

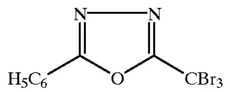

(13)

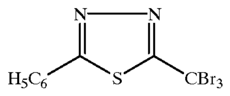

(14)

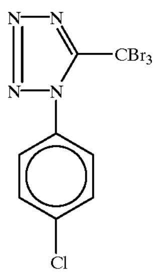

(15)

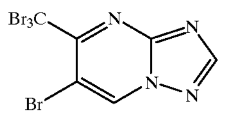

-continued (16)

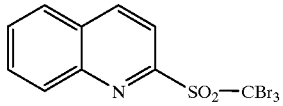

(17)

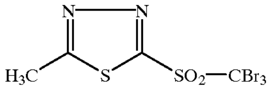

(18)

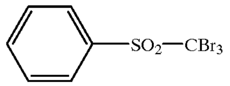

Examples of more preferable anti-fogging agents are disclosed in, for example, U.S. Pat. No. 5,028,523 and British Patent Application Nos. 92221383.4, 9300147.7, and 9311790.1.

The heat development photosensitive material constituted of the materials described above is exposed, and thereafter development is carried out on the photosensitive material. How the process for the exposure and the development is carried out will be described hereinbelow with reference to the accompanying drawings.

Figure 2:
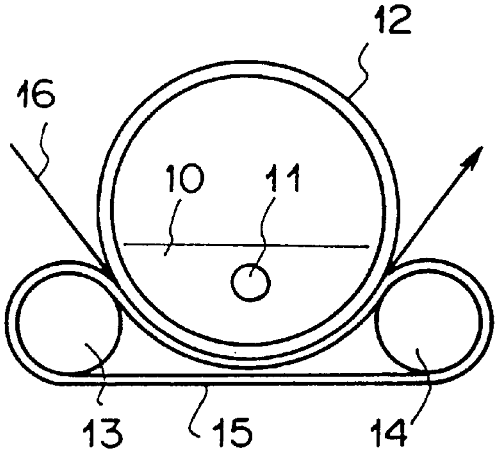
FIG. 2 is a schematic side view showing a second embodiment of the image recording apparatus in accordance with the present invention.

FIG. 1 is a schematic side view showing a first embodiment of the image recording apparatus in accordance with the present invention. FIG. 2 is a schematic side view showing a second embodiment of the image recording apparatus in accordance with the present invention.

In the first embodiment of FIG. 1, a laser beam 1*a* is produced by a laser beam source 1. The laser beam 1*a* is modulated with an image signal representing multiple gradation levels. The laser beam 1*a* is caused by a laser beam scanning system, which comprises a rotating polygon mirror 3, a scanning lens 7, and a mirror 9, to scan on a heat development photosensitive material sheet 8. As a result, a latent image, which is represented by the image signal representing multiple gradation levels, is recorded on the heat development photosensitive material sheet 8. The heat development photosensitive material sheet 8, on which the latent image has been recorded, is conveyed to a drum type of heat development apparatus. The drum type of heat development apparatus comprises a cylindrical heating drum 4, a halogen lamp 2 located within the heating drum 4, and an endless belt 6 for conveyance, which is threaded over feed rollers 5, 5, . . . such that it may be brought into close contact with the circumferential surface of the heating drum 4. The heat development photosensitive material sheet 8 is conveyed into the region between the endless bent 6 and the heating drum 4, is sandwiched between the endless bent 6 and the heating drum 4, and is thereby conveyed along the circumferential surface of the heating drum 4. With the drum type of heat development apparatus, the width-direction temperature accuracy can be enhanced to approximately ±1° C. by optimizing the distribution of light intensity of the halogen lamp 2. Therefore, the drum type of heat development apparatus is suitable for achieving heat development at a high accuracy.

In the second embodiment of FIG. 2, a cylindrical heating drum 12 is provided therein with a heat source, which comprises an oil 10 and a heater 11 immersed in the oil 10. An endless belt 15 for conveyance is threaded over feed rollers 13 and 14 such that it may be brought into close contact with a portion (a heating side portion) of the circumferential surface of the heating drum 12. A heat development photosensitive material sheet 16 is sandwiched and conveyed between the endless belt 15 and the heating drum 12. With this drum type of heat development apparatus, good temperature stability can be obtained, and the width-direction temperature accuracy can be kept at approximately ±1.5° C. Therefore, the drum type of heat development apparatus is suitable for achieving heat development at a high accuracy.

The heat development temperature should be approximately 120° C. In cases where the heat development temperature falls within the range of 110° C. to 130° C., image development can be achieved appropriately. The development should preferably be carried out at a temperature falling within the range of 115° C. to 125° C. In cases where the development temperature is set to be 120° C., the image can be obtained accurately with a development time of approximately 10 seconds.

If the temperature is high, fogging will occur with the heat development photosensitive material. However, in cases where the heat development is carried out with the image recording method and apparatus in accordance with the present invention, the occurrence of fogging can be restricted. Byway of example, at a temperature of 125° C., the degree of fogging is approximately 0.2. The degree of fogging should preferably be restricted to at most approximately 0.15. For such purposes, the heat development should preferably be carried out at a heating temperature of approximately 120° C. With the image recording method and apparatus in accordance with the present invention, the maximum density falls within the range of approximately 3 to approximately 3.5.

As described above, the materials and the apparatus can be modified in various ways such that the effects of the image recording method in accordance with the present invention may not be lost.

Figure 3:
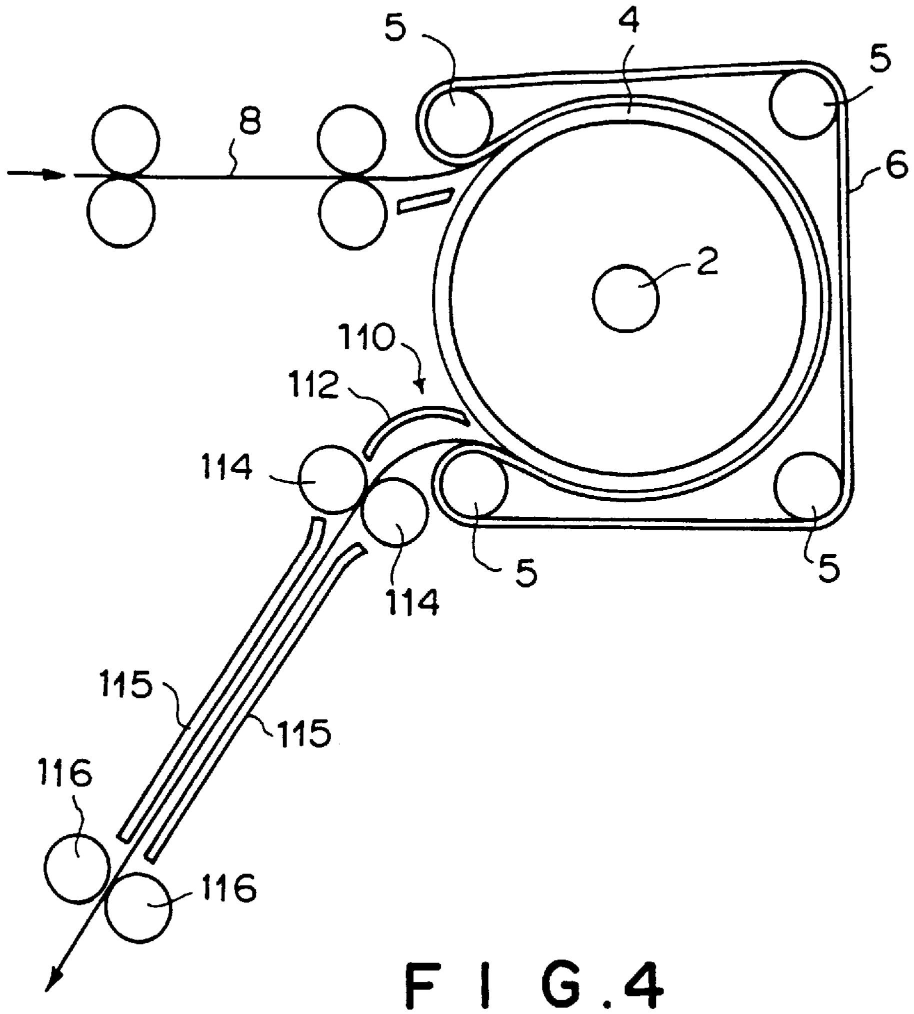
FIG. 3 is a schematic side view showing a third embodiment of the image recording apparatus in accordance with the present invention.

FIG. 3 is a schematic side view showing a third embodiment of the image recording apparatus in accordance with the present invention. In FIG. 3, similar elements are numbered with the same reference numerals with respect to FIG. 1.

In the third embodiment of FIG. 3, the heat development photosensitive material sheet (hereinbelow referred to simply as the photosensitive sheet) 8, on which the latent image has been recorded, is sandwiched and conveyed between the endless belt 6 and the heating drum 4. While the photosensitive sheet 8 is thus conveyed, it is heated to a development temperature falling within the range of approximately 120±20° C., and the latent image is developed. In this manner, the heat development is carried out.

The photosensitive sheet 8, which is conveyed between the endless belt 6 and the heating drum 4, is fed out from an outlet 110. In the vicinity of the outlet 110, a curl eliminating guide plate 112 is located. The curl eliminating guide plate 112 corrects the form of the photosensitive sheet 8, which has been released from the curved circumferential surface of the heating drum 4, into a straight form. In the vicinity of the curl eliminating guide plate 112, the ambient temperature is adjusted such that the temperature of the photosensitive sheet 8 may not become lower than 90° C., which is the upper limit of the glass transition temperature Tgb (85±5° C.) of polyethylene terephthalate (PET) constituting the substrate. Therefore, curl of the photosensitive sheet 8 is not fixed before the form of the photosensitive sheet 8 is corrected into the straight form. In this embodiment, the curl eliminating guide plate 112 guides the photosensitive sheet 8 along the path curved reversely to the curve of the heating drum 4. Curl of the photosensitive sheet 8 is thus eliminated slightly forcibly.

Figure 5:
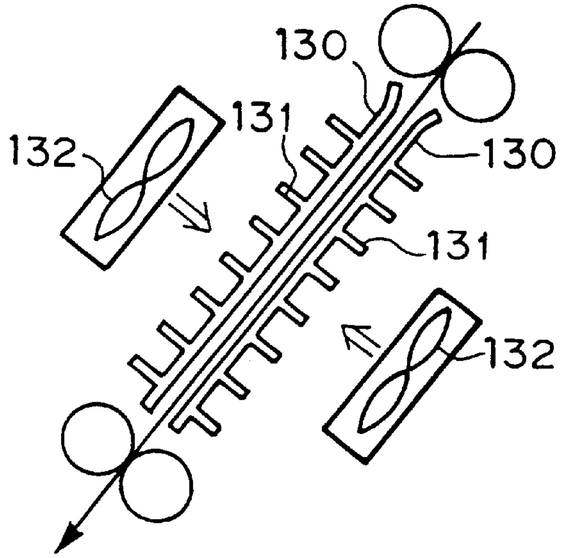
FIG. 5 is a schematic side view showing an example of a cooling means in a fifth embodiment of the image recording apparatus in accordance with the present invention.
Figure 8:
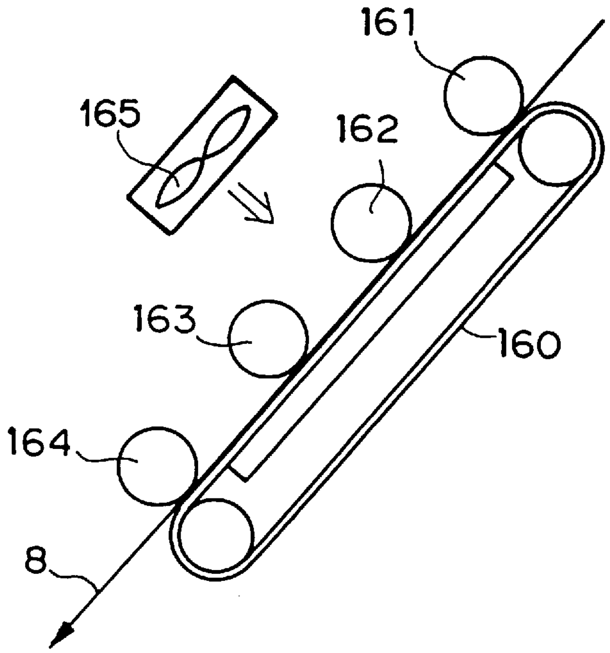
FIG. 8 is a schematic side view showing an example of a cooling means in an eighth embodiment of the image recording apparatus in accordance with the present invention.

On the side downstream from the outlet 110, a pair of feed rollers 114, 114 for feeding the photosensitive sheet 8 are located at positions adjacent to the outlet 110. On the side downstream from the feed rollers 114, 114, a pair of flat guides 115, 115 are located at positions adjacent to the feed rollers 114, 114. The flat guides 115, 115 keep the photosensitive sheet 8 in the straight form and guide it. On the side downstream from the flat guides 115, 115, a pair of feed rollers 116, 116 are located at positions adjacent to the flat guides 115, 115. The flat guides 115, 115 have lengths such that the photosensitive sheet 8 may be cooled while it is being guided and conveyed between the flat guides 115, 115. Specifically, while the photosensitive sheet 8 is being guided and conveyed between the flat guides 115, 115, the photosensitive sheet 8 is cooled to a temperature lower than 80° C., which is the lower limit of the glass transition temperature Tgb (85±5° C.) of PET constituting the substrate. As means for the cooling, a cooling fan (not shown in FIG. 3 and is shown in FIGS. 5 and 8) may be utilized. Alternatively, the cooling may be effected by natural cooling with the environmental temperature.

The cooling may be carried out in various ways such that the photosensitive sheet 8 may be cooled to a temperature lower than 80° C. while the photosensitive sheet 8 is being kept in the straight form and guided. The temperature of 80° C. is the lower limit of the glass transition temperature Tgb (85±5° C.) of PET constituting the substrate of the photosensitive sheet 8. In cases where a glass transition temperature Tge of the binder contained in the emulsion layer is lower than the lower limit of the glass transition temperature Tgb of PET constituting the substrate, the photosensitive sheet 8 should be cooled to a temperature lower than the glass transition temperature Tge of the binder contained in the emulsion layer. Specifically, the cooling temperature should be lower than the glass transition temperature Tg of every constituent of the photosensitive sheet 8, and the cooling should be completed while the photosensitive sheet 8 is being kept in the straight form.

In the third embodiment, the development temperature is set to fall within the range of 120±20° C., the temperature during the curl elimination is set to be at least 90° C., and the cooling temperature is set to be lower than 80° C. These setting values are for the cases where the substrate is constituted of PET having the glass transition temperature Tgb falling within the range of 85±5° C., and a binder having the glass transition temperature Tge not lower than the glass transition temperature Tgb of PET. The setting values may be altered in accordance with the materials used. In particular, in cases where the development temperature is higher than both of the glass transition temperature Tgb of the substrate of the photosensitive sheet 8 and the glass transition temperature Tge of the binder contained in the emulsion layer, the temperature during the elimination of curl should be set at a temperature equal to at least the glass transition temperature TgH, that is equal to the glass transition temperature Tgb of the substrate of the photosensitive sheet 8 or the glass transition temperature Tge of the binder contained in the emulsion layer, whichever takes a larger value. In this manner, curl should be eliminated under the conditions such that curl of the substrate and curl of the emulsion layer may not be fixed. It is sufficient for the cooling temperature to be lower than the glass transition temperature TgL, that is equal to the glass transition temperature Tgb of the substrate or the glass transition temperature Tge of the binder contained in the emulsion layer, whichever takes a smaller value. No other limitation is imposed on the cooling temperature.

After the heat development has been carried out on the photosensitive sheet 8 by the heating drum 4 at the development temperature, the photosensitive sheet 8 is discharged through the outlet 110 and released by the curl eliminating guide plate 112 from the curve along the circumferential surface of the heating drum 4. Also, the form of the photosensitive sheet 8 is corrected from the curved form to the straight form (in the curl eliminating step). Thereafter, the photosensitive sheet 8 is cooled at the cooling temperature while it is being kept in the straight form.

In the third embodiment of FIG. 3, the distance between the flat guides 115, 115 may be at most 8 mm, should preferably be at most 5 mm, and should more preferably be at most 3 mm. In order for the cooling effects to be enhanced, the flat guides 115, 115 should preferably be constituted of a material, such as aluminum, which has good heat conduction properties. However, in cases where the shape, or the like, of the flat guides 115, 115 is designed appropriately, or a cooling fan is utilized, the flat guides 115, 115 may be constituted of a resin. Such that the friction with the photosensitive sheet 8 may be reduced, the inner surfaces of the guide members for guiding the photosensitive sheet 8, such as the curl eliminating guide plate 112, should preferably be subjected to surface treatment, such as Teflon coating.

Figure 4:
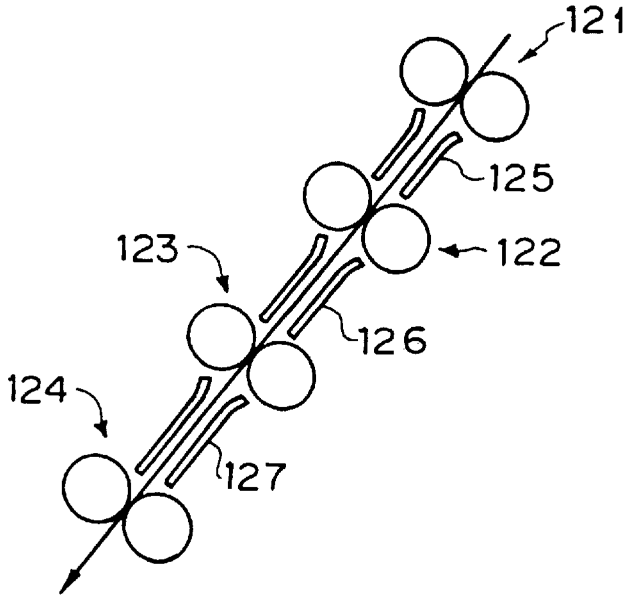
FIG. 4 is a schematic side view showing an example of a cooling means in a fourth embodiment of the image recording apparatus in accordance with the present invention.

The cooling path may be set to be long by successively locating a plurality of combinations of the flat guides 115, 115 for the cooling and the feed rollers 114, 114. Alternatively, the cooling path may be divided into a plurality of sections along the length direction, and gaps for introducing external air may be formed between the sections. FIG. 4 shows an example of a cooling means in a fourth embodiment of the image recording apparatus in accordance with the present invention, wherein pairs of feed rollers are located among a plurality of pairs of flat guides. In the example of FIG. 4, three pairs of flat guides 125, 126, and 127 are located among four pairs of rollers 121, 122, 123, and 124.

FIG. 5 shows an example of a cooling means in a fifth embodiment of the image recording apparatus in accordance with the present invention. In this example, cooling fins 131, 131 are formed on the outer surfaces of two flat guides 130, 130 facing each other. Also, cooling fans 132, 132 are located at the positions facing the flat guides 130, 130. In this manner, the cooling effects can be enhanced.

Figure 6:
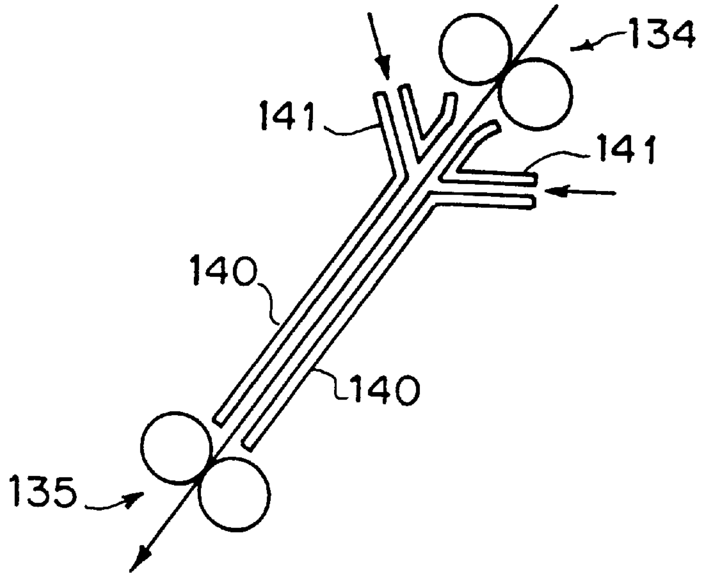
FIG. 6 is a schematic side view showing an example of a cooling means in a sixth embodiment of the image recording apparatus in accordance with the present invention.

FIG. 6 shows an example of a cooling means in a sixth embodiment of the image recording apparatus in accordance with the present invention. In this example, two flat guides 140, 140 are located between two feed roller pairs 134 and 135. Air inlets 141, 141 for introducing cooling air are respectively combined integrally with the flat guides 140, 140. The air inlets 141, 141 are formed at positions close to the ends of the flat guides 140, 140 on the upstream side with respect to the direction of conveyance. In this manner, the cooling effects are enhanced by utilizing cooling air. With the examples of FIGS. 5 and 6, wherein the cooling effects are enhanced, the cooling path can be set to be short.

Figure 7:
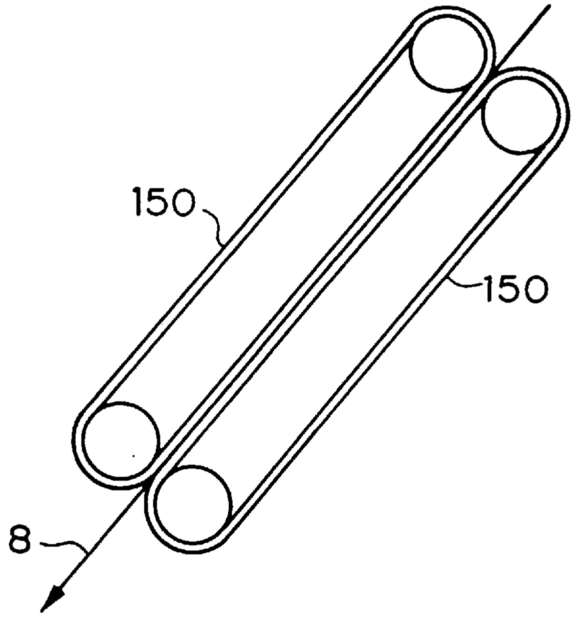
FIG. 7 is a schematic side view showing an example of a cooling means in a seventh embodiment of the image recording apparatus in accordance with the present invention.

FIG. 7 shows an example of a cooling means in a seventh embodiment of the image recording apparatus in accordance with the present invention. In this example, the photosensitive sheet 8 is sandwiched and conveyed between a pair of endless belts 150, 150, which are located such that their straight portions may stand facing each other. The endless belts 150, 150 are constituted of a material having good heat conduction properties and good cooling effects. A reliable cooling means can thereby be obtained.

FIG. 8 shows an example of a cooling means in an eighth embodiment of the image recording apparatus in accordance with the present invention. In this example, and endless belt 160 is located only on one side of the conveyance path for the photosensitive sheet 8. Four feed rollers 161, 162, 163, and 164 stand facing the straight portion of the endless belt 160, which straight portion is in contact with the conveyance path. Also, a cooling fan 165 is located on the side outward from the feed rollers 161, 162, 163, and 164. With this example, the cooling effects can be enhanced by the forcible cooling, and the time required for the cooling can be kept short.

In the third to eighth embodiments described above, it is necessary for the ambient temperature to be adjusted such that, in the vicinity of the curl eliminating guide plate 112 located at the outlet 110, through which the photosensitive sheet 8 is fed out from between the heating drum 4 and the endless belt 6, the temperature of the photosensitive sheet 8 may not become lower than the upper limit (in the cases of PET, 90° C.) of the glass transition temperature Tgb of the substrate. Therefore, though not shown, a heating fan for blowing hot air may be utilized. As the heat source for the heating fan, a new heater may be employed. Alternatively, heat of the heating drum 4 may be utilized as the heat source for the heating fan.

What is claimed is:

1. An image recording method, comprising:

recording a latent image of a medical image on a heat development photosensitive material;

carrying out development on the heat development photosensitive material, on which the latent image of the medical image has been recorded, and thereby obtaining the medical image having multiple gradation levels, wherein the development is carried out at a heating temperature falling within the range of 120±10° C., wherein a temperature differential across the heat development photosensitive material falls within the range of ±3° C., and wherein a development time falls within the range of 5 seconds to 30 seconds.

2. A method as defined in claim 1 wherein the temperature differential falls within the range of ±1° C.

3. A method as defined in claim 1 wherein the heating temperature is controlled at a temperature accuracy falling within the range of ±0.1° C.

4. An image recording apparatus, wherein a latent image of a medical image is recorded on a heating development photosensitive material, development is carried out on the heat development photosensitive material, on which the latent image of the medical image has been recorded, and the medical image having multiple gradation levels is thereby obtained, the apparatus comprising:

heating means for heating the heat development photosensitive material, on which the latent image of the medical image has been recorded, at a heating temperature falling within the range of 120±10° C.;

temperature differential controlling means, coupled to the heating means, for controlling a temperature differential across the heat development photosensitive material to fall within the range of ±3° C.; and development means, coupled to the heating means, for developing the heat development photosensitive material for a development time falling within the range of 5 seconds to 30 seconds.

5. An apparatus as defined in claim 4 wherein the temperature differential controlled by said width-direction temperature controlling means falls within the range of ±1° C.

6. An apparatus as defined in claim 4 wherein the apparatus further comprises a temperature controlling means for controlling the heating temperature of said heating means at a temperature accuracy falling within the range of ±0.1° C.

7. An image recording method, wherein a latent image is recorded on a heat development photosensitive material, which comprises a substrate and an emulsion layer overlaid upon the substrate, the emulsion layer containing a binder and a photosensitive silver halide dispersed in the binder, the heat development photosensitive material, on which the latent image has been recorded, is then conveyed along a curved conveyance path and subjected to heat development, and an image is thereby obtained, the method comprising:

i) carrying out the heat development at a development temperature, which is set to be equal to at least a glass transition temperature Tgb of the substrate of the heat development photosensitive material, ii) after said heat development, straightening the heat development photosensitive material while the temperature of the heat development photosensitive material is being kept at a curl elimination temperature, which is set to be equal to at least the glass transition temperature Tgb of the substrate of the heat development photosensitive material, and iii) cooling the heat development photosensitive material while said heat development photosensitive is straight, said cooling being carried out at a cooling temperature lower than a glass transition temperature TgL, that is equal to a lower one of the glass transition temperature Tgb of the substrate of the heat development photosensitive material and a glass transition temperature Tge of the binder contained in the emulsion layer.

8. A method as defined in claim 7 wherein the substrate of the heat development photosensitive material is constituted of a polyethylene terephthalate.

9. A method as defined in claim 7 wherein the development temperature falls within the range of 120±20° C.

10. A method as defined in claim 7 wherein the curl elimination temperature is set to be at least 85° C.

11. A method as defined in claim 7 wherein the cooling temperature is set to be at most 85° C.

12. An image recording apparatus, wherein a latent image is recorded on a heat development photosensitive material, which comprises a substrate and an emulsion layer overlaid upon the substrate, the emulsion layer containing a binder and a photosensitive silver halide dispersed in the binder, the heat development photosensitive material, on which the latent image has been recorded, is then subjected to heat development, and an image is thereby obtained, the apparatus comprising:

conveyance means for conveying the heat development photosensitive material along a predetermined conveyance path, curved-path conveyance and heating means, which is located in said predetermined conveyance path, said curved-path conveyance and heating means hating the heat development photosensitive material, on which the latent image has been recorded, at a temperature, that is set to be equal to at least a glass transition temperature Tgb of the substrate of the heat development photosensitive material, curl eliminating means, which is located in said predetermine conveyance path and at a position downstream from said curved-path conveyance and heating means, said curl eliminating means straightening the heat development photosensitive material while the temperature of the heat development photosensitive material is being kept to be equal to at least the glass transition temperature Tgb of the substrate of the heat development photosensitive material, and cooling means, which is located in said predetermine conveyance path and at a position downstream from said curl eliminating means, said cooling means cooling the heat development photosensitive material while the heat development photosensitive material straight, said cooling being carried out at a cooling temperature lower than a glass transition temperature TgL, that is equal to a lower one of the glass transition Tgb of the substrate of the heat development photosensitive material and a glass transition temperature Tge of the binder contained in the emulsion layer.

13. An apparatus as defined in claim 12 wherein said heating means heats the heat development photosensitive material at a temperature falling within the range of 120±20° C.

14. An apparatus as defined in claim 12 wherein said curl eliminating means sets the heat development photosensitive material to straight form while the temperature of the heat development photosensitive material is being kept at a curl elimination temperature, which is set to be equal to at least 85° C.

15. An apparatus as defined in claim 12 wherein said cooling means cools the heat development photosensitive material at a cooling temperature lower than 85° C.

16. An apparatus as defined in claim 12 wherein said curved-path conveyance and heating means, said curl eliminating means, and said cooling means constitute portions of said conveyance means and respectively carry out the heating, the curl elimination, and the cooling while the heat development photosensitive material is being conveyed.

17. An apparatus as defined in claim 12 wherein said cooling means comprises:

a) at least a single pair of conveying rollers for conveying the heat development photosensitive material, b) guide members, which are located at positions adjacent to the pair of said conveying rollers, said guide members guiding the heat development photosensitive material, which is conveyed by the pair of said conveying rollers, such that the heat development photosensitive material may be set to the straight form, and c) a cooling fan for cooling the heat development photosensitive material, which is being guided by said guide members.

18. An apparatus as defined in claim 12 wherein said curved-path conveyance and heating means is a heating drum.

19. An image recording method, comprising:

(a) recording a latent image on a photosensitive material; and (b) developing the photosensitive material containing the latent image to produce a developed image by heating the photosensitive material to a heating temperature between 110° C. and 130° C., wherein a temperature differential across the photosensitive material is less than ±3° C.

20. The image recording method as claimed in claim 19, wherein a development time for developing the photosensitive material is between 5 seconds and 30 seconds.

21. The image recording method as claimed in claim 19, wherein the developed image has multiple gradation levels.

22. The image recording method as claimed in claim 19, wherein the temperature differential across the photosensitive material is less than ±1° C.

23. The image recording method as claimed in claim 19, wherein the heating temperature is controlled to have a temperature accuracy falling within the range of ±0.1° C.

24. The image recording method as claimed in claim 19, wherein the photosensitive material comprises a constituent element and wherein the method further comprises:

(c) after developing the photosensitive material, straightening the photosensitive element while a straightening temperature is applied to the photosensitive material, wherein the straightening temperature is greater than or equal to a glass transition temperature of the constituent element.

25. The image recording method as claimed in claim 24, wherein the constituent element is a substrate of the photosensitive material.

26. The image recording method as claimed in claim 24, wherein the constituent element is a binder contained in an emulsion layer of the photosensitive material.

27. The image recording method as claimed in claim 24, wherein the method further comprises:

(d) after straightening the photosensitive material, cooling the photosensitive material by applying a cooling temperature to the photosensitive material, wherein the cooling temperature is less a glass transition temperature of the constituent element.

28. The image recording method as claimed in claim 27, wherein the constituent element is a substrate of the photosensitive material.

29. The image recording method as claimed in claim 27, wherein the constituent element is a binder contained in an emulsion layer of the photosensitive material.

30. The image recording method as claimed in claim 19, wherein the photosensitive material comprises a substrate and an emulsion layer, wherein a binder is contained in the emulsion layer, and wherein the method further comprises:

(c) after developing the photosensitive material, straightening the photosensitive element while a straightening temperature is applied to the photosensitive material, wherein the straightening temperature is greater than or equal to a glass transition temperature of the substrate if the glass transition temperature of the substrate is greater than a glass transition temperature of the binder, and wherein the straightening temperature is greater than or equal to the glass transition temperature of the binder if the glass transition temperature of the binder is greater than a glass transition temperature of the substrate.

31. The image recording method as claimed in claim 27, wherein the photosensitive material comprises a substrate and an emulsion layer, wherein a binder is contained in the emulsion layer, and wherein the method further comprises:

(d) after straightening the photosensitive material, cooling the photosensitive material by applying a cooling temperature to the photosensitive material, wherein the cooling temperature is less than a glass transition temperature of the substrate if the glass transition temperature of the substrate is less than a glass transition temperature of the binder, and wherein the cooling temperature is less than the glass transition temperature of the binder if the glass transition temperature of the binder is less than a glass transition temperature of the substrate.

32. An image recording apparatus, comprising:

a conveyance device that conveys a photosensitive material along a predetermined conveyance path; and a developer that is located in the predetermined conveyance path and that heats the photosensitive material on which a latent image has been recorded to produce a developed image, wherein the developer heats the photosensitive image at a heating temperature between 110° C. and 130° C. and wherein the developer controls the heating temperature such that a temperature gradient across the photosensitive material is less than ±3° C.

33. The image recording apparatus as claimed in claim 32, wherein the developer develops the photosensitive material for a development time that falls within the range of 5 seconds to 30 seconds.

34. The image recording apparatus as claimed in claim 32, wherein the developer controls the heating temperature such that a temperature gradient across the photosensitive material is less than ±1° C.

35. The image recording apparatus as claimed in claim 32, wherein the developer controls the heating temperature at a temperature accuracy falling within the range of ±0.1° C.

36. The image recording apparatus as claimed in claim 32, wherein the photosensitive material comprises a constituent element and wherein the image recording apparatus further comprises:

a straightening device that is located downstream from the developer and straightens the photosensitive material while a straightening temperature is applied to the photosensitive material, wherein the straightening temperature is greater than or equal to a glass transition temperature of the constituent element.

37. The image recording apparatus as claimed in claim 36, wherein the constituent element is a substrate of the photosensitive material.

38. The image recording apparatus as claimed in claim 36, wherein the constituent element is a binder contained in an emulsion layer of the photosensitive material.

39. The image recording apparatus as claimed in claim 36, further comprising:

a cooling device that is located downstream from the straightening device and that cools the photosensitive material by applying a cooling temperature to the photosensitive material, wherein the cooling temperature is less a glass transition temperature of the constituent element.

40. The image recording apparatus as claimed in claim 39, wherein the constituent element is a substrate of the photosensitive material.

41. The image recording apparatus as claimed in claim 39, wherein the constituent element is a binder contained in an emulsion layer of the photosensitive material.

42. The image recording apparatus as claimed in claim 39, wherein the cooling device comprises:

a pair of conveying rollers for conveying the photosensitive material; and guide members that are disposed adjacent to the pair of the conveying rollers and guide the photosensitive material, wherein the photosensitive material passes between the guide members.

43. The image recording apparatus as claimed in claim 42, wherein the cooling device further comprises:

a cooling fan that cools the photosensitive material when the photosensitive material is guided by the guide members.

44. The image recording apparatus as claimed in claim 42, wherein the guide members comprise cooling fins that extend from the guide members away from the photosensitive material when the photosensitive material is being guided by the guide members.

45. The image recording apparatus as claimed in claim 42, wherein the guide members comprise air inlets that enable air to be supplied to the photosensitive material when the photosensitive material is being guided by the guide members.

46. The image recording apparatus as claimed in claim 39, wherein the cooling device comprises:

a first endless belt that conveys the photosensitive material when the photosensitive material is straightened.

47. The image recording apparatus as claimed in claim 46, wherein the cooling device comprises:

a second endless belt that opposes the first endless belt, wherein the photosensitive material is guided between the first endless belt and the second endless belt.

48. The image recording apparatus as claimed in claim 46, wherein the cooling device further comprises:

a cooling fan that cools the photosensitive material when the photosensitive material is guided along the first endless belt.

49. The image recording apparatus as claimed in claim 36, wherein the photosensitive material comprises a substrate and an emulsion layer, wherein a binder is contained in the emulsion layer, and wherein the image recording apparatus further comprises:

a cooling device that is located downstream from the straightening device and cools the photosensitive material while a cooling temperature is applied to the photosensitive material, wherein the cooling temperature is less than a glass transition temperature of the substrate if the glass transition temperature of the substrate is lower than a glass transition temperature of the binder, and wherein the straightening temperature is lower than the glass transition temperature of the binder if the glass transition temperature of the binder is less than a glass transition temperature of the substrate.

50. The image recording apparatus as claimed in claim 32, wherein the photosensitive material comprises a substrate and an emulsion layer, wherein a binder is contained in the emulsion layer, and wherein the image recording apparatus further comprises:

a straightening device that is located downstream from the developer and straightens the photosensitive material while a straightening temperature is applied to the photosensitive material, wherein the straightening temperature is greater than or equal to a glass transition temperature of the substrate if the glass transition temperature of the substrate is greater than a glass transition temperature of the binder, and wherein the straightening temperature is greater than or equal to the glass transition temperature of the binder if the glass transition temperature of the binder is greater than a glass transition temperature of the substrate.

* * * * *